United States Patent

Dowling

(10) Patent No.: US 10,871,948 B1
(45) Date of Patent: Dec. 22, 2020

(54) SMART CONTRACT BLOCKCHAIN ABSTRACTION API

(71) Applicant: Wells Fargo Bank, N.A., San Francisco, CA (US)

(72) Inventor: Michael D. Dowling, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 293 days.

(21) Appl. No.: 15/610,311

(22) Filed: May 31, 2017

Related U.S. Application Data

(60) Provisional application No. 62/479,079, filed on Mar. 30, 2017.

(51) Int. Cl.
G06Q 10/10 (2012.01)
G06Q 10/06 (2012.01)
G06Q 10/08 (2012.01)
G06Q 30/06 (2012.01)
G06Q 30/02 (2012.01)
G06F 8/30 (2018.01)
G06Q 20/22 (2012.01)
G06Q 20/40 (2012.01)
G06F 21/60 (2013.01)

(52) U.S. Cl.
CPC .......... *G06F 8/311* (2013.01); *G06F 21/604* (2013.01); *G06Q 20/223* (2013.01); *G06Q 20/405* (2013.01)

(58) Field of Classification Search
CPC .... G06Q 20/223; G06Q 20/405; G06F 8/311; G06F 21/604

USPC .................................................... 705/1.1–912
See application file for complete search history.

(56) References Cited

U.S. PATENT DOCUMENTS 10,158,479 B2 * 12/2018 Chapman .............. H04L 9/0637
2015/0379510 A1 * 12/2015 Smith ................ G06Q 20/3829
705/71

(Continued)

OTHER PUBLICATIONS

Burniske, Christopher (Ark Analyst), "Bitcoin and Ethereum: How Smart Contracts Work," Ark Invest (https://ark-invest.com/research/smart-contract-work), May 29, 2016. (Year: 2016).*

(Continued)

*Primary Examiner* — Jonathan P Ouellette
(74) *Attorney, Agent, or Firm* — Foley & Lardner LLP

(57) ABSTRACT

A system, method, and apparatus for creating and managing smart contracts on a blockchain is provided. A method includes receiving smart contract code; detecting a code language of the smart contract code; determining an optimal blockchain platform to deploy the smart contract onto; compiling the smart contract code so as to generate smart contract byte code and metadata; storing the smart contract byte code and the metadata; deploying the smart contract byte code to the optimal blockchain platform; receiving an address of the smart contract deployed to the optimal blockchain platform; assigning a name to the address; and storing the assigned name and the address in a smart contract naming directory; wherein a smart contract computing system is configured to identify the address of the deployed smart contract in response to receiving the name from a user.

30 Claims, 8 Drawing Sheets

(56) References Cited

U.S. PATENT DOCUMENTS

| | | | |
|---|---|---|---|
| 2016/0092988 A1* | 3/2016 | Letourneau | G06Q 40/06 |
| | | | 705/66 |
| 2016/0203496 A1 | 7/2016 | Guerrero et al. | |
| 2016/0300234 A1 | 10/2016 | Moss-Pultz et al. | |
| 2016/0323109 A1* | 11/2016 | McCoy | G06Q 50/184 |
| 2016/0330027 A1 | 11/2016 | Ebrahimi | |
| 2017/0011460 A1* | 1/2017 | Molinari | G06Q 40/04 |
| 2017/0186057 A1* | 6/2017 | Metnick | G06Q 30/0601 |
| 2017/0279774 A1* | 9/2017 | Booz | G06F 16/24568 |
| 2017/0330174 A1* | 11/2017 | Demarinis | G06Q 40/04 |
| 2017/0345011 A1* | 11/2017 | Salami | G06Q 20/42 |
| 2018/0075453 A1* | 3/2018 | Durvasula | G06Q 20/4016 |
| 2018/0089758 A1* | 3/2018 | Stradling | G06Q 20/3829 |
| 2018/0218176 A1* | 8/2018 | Voorhees | H04L 9/3239 |
| 2018/0218343 A1* | 8/2018 | Kolb | G06Q 20/102 |
| 2018/0343114 A1* | 11/2018 | Ben-Ari | H04L 9/0825 |
| 2019/0080392 A1* | 3/2019 | Youb | G06F 21/64 |

OTHER PUBLICATIONS

Nakamoto, Satoshi, "Bitcoin: A Peer-to-Peer Electronic Cash System", www.bitcoin.org, 2008. 9 pages.

Peters et al., "Understanding Modern Banking Ledgers through Blockchain Technologies: Future of Transaction Processing and Smart Contracts on the Internet of Money", UCL, Department of Computer Science, Nov. 19, 2015. 33 pages.

\* cited by examiner

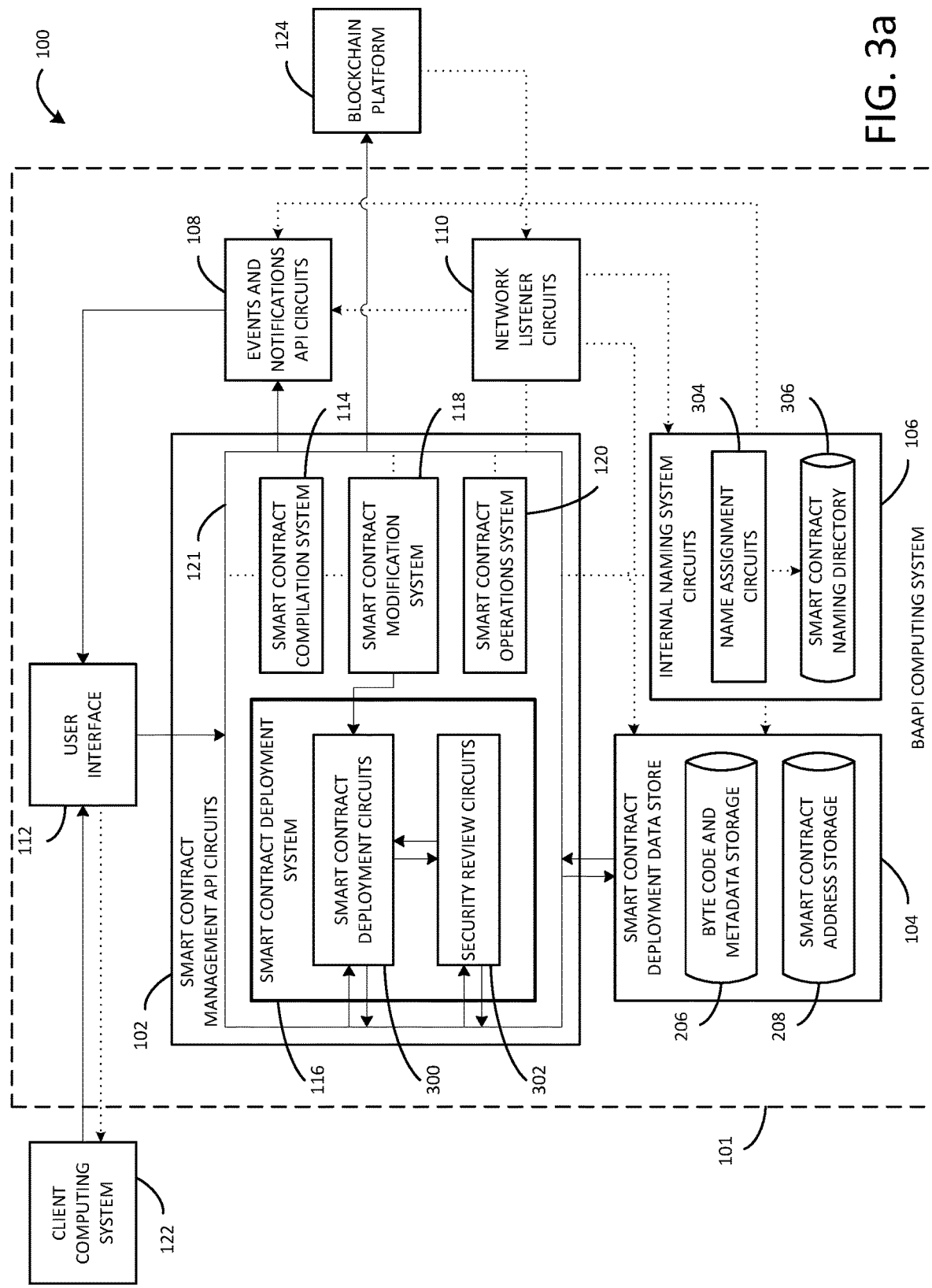

SMART CONTRACT BLOCKCHAIN ABSTRACTION API

CROSS-REFERENCE TO RELATED APPLICATIONS

This application claims the benefit of priority to U.S. Application No. 62/479,079, filed Mar. 30, 2017, entitled "SMART CONTRACT BLOCKCHAIN ABSTRACTION API", which is hereby incorporated by reference in its entirety.

TECHNICAL FIELD

The present application relates generally to systems and methods for creating and managing smart contracts on a blockchain.

BACKGROUND

Within the field of financial transactions, smart contracts offer clients an alternative to the traditional method of conducting transactions. There are a number of advantages to using a smart contract to carry out a financial transaction. Smart contracts allow a user to create code that automatically executes a transactional action in response to the fulfillment of a condition. Actions that may be executed via a smart contract include, for example, a transfer of funds or an escrow transaction. Smart contracts are implemented by deploying the code defining the terms and conditions of the smart contract onto a blockchain. Therefore, as opposed to a traditional financial transaction, smart contract transactions are confirmed by a peer-to-peer network of users rather than by a trusted third party. This allows smart contract transactions to be confirmed and executed in a much faster time than it typically takes for similar traditional transactional actions. Thus, smart contracts offer clients the benefits of automatic execution upon the fulfillment of a condition, as well as typically faster confirmations than transactions conducted in a traditional manner.

SUMMARY

One embodiment relates to a method. The method includes receiving, by a smart contract computing system, smart contract code. The smart contract code defines terms of a smart contract. The method also includes detecting, by the computing system, a code language of the smart contract code, wherein each of a plurality of code languages is associated with at least one of a plurality of blockchain platforms; determining, by the computing system, based at least partially on the code language of the smart contract code, an optimal blockchain platform to deploy the smart contract onto, the optimal blockchain platform being one of the plurality of blockchain platforms associated with the detected code language; and compiling, by the computing system, the smart contract code based on the determination of the optimal blockchain platform so as to generate smart contract byte code and metadata. The method further includes storing, by the computing system, the smart contract byte code and the metadata; deploying, by the computing system, the smart contract byte code to the optimal blockchain platform; receiving, by the computing system, an address from the optimal blockchain platform of the smart contract deployed to the optimal blockchain platform; and assigning, by the computing system, a name to the address. Finally, the method includes storing, by the computing system, the assigned name and the address in a smart contract naming directory, wherein the smart contract computing system is configured to identify the address of the deployed smart contract in response to receiving the name from a user.

Another embodiment relates to a method. The method includes receiving, by a smart contract computing system, smart contract code, the smart contract code defining terms of a smart contract, and receiving, by the computing system, a call name for the smart contract from a user. The method also includes detecting, by the computing system, a code language of the smart contract code, wherein each of a plurality of code languages is associated with at least one of a plurality of blockchain platforms; determining, by the computing system, based at least partially on the code language of the smart contract code, an optimal blockchain platform to deploy the smart contract onto, the optimal blockchain platform being one of the plurality of blockchain platforms associated with the detected code language; and compiling, by the computing system, the smart contract code based on the determination of the optimal blockchain platform so as to generate smart contract byte code and metadata. The method additionally includes storing, by the computing system, the smart contract byte code and the metadata, including associating the smart contract byte code and the metadata with the call name; receiving, by the computing system, an instruction from the user to deploy the smart contract known by the call name; and identifying, by the computing system, the stored smart contract byte code associated with the call name. Further, the method includes deploying, by the computing system, the smart contract byte code to the optimal blockchain platform; receiving, by the computing system, an address from the optimal blockchain platform of the smart contract deployed to the optimal blockchain platform; and assigning, by the computing system, a name to the address. Finally, the method includes storing, by the computing system, the assigned name and the address in a smart contract naming directory, wherein the smart contract computing system is configured to identify the address of the deployed smart contract in response to receiving the name from the user.

Another embodiment relates to a system comprising machine-readable media. The machine-readable media is configured to receive, by a smart contract computing system, smart contract code. The smart contract code defines terms of a smart contract. The machine-readable media is also configured to detect, by the computing system, a code language of the smart contract code, wherein each of a plurality of code languages is associated with at least one of a plurality of blockchain platforms; determine, by the computing system, based at least partially on the code language of the smart contract code, an optimal blockchain platform to deploy the smart contract onto, the optimal blockchain platform being one of the plurality of blockchain platforms associated with the detected code language; and compile, by the computing system, the smart contract code based on the determination of the optimal blockchain platform so as to generate smart contract byte code and metadata. The machine-readable media is further configured to store, by the computing system, the smart contract byte code and the metadata; deploy, by the computing system, the smart contract byte code to the optimal blockchain platform; receive, by the computing system, an address from the optimal blockchain platform of the smart contract deployed to the optimal blockchain platform; and assign, by the computing system, a name to the address. Finally, the machine-readable media is configured to store, by the computing system, the associated name and the address is a smart contract naming directory, wherein the smart contract computing system is configured to identify the address of the deployed smart contract in response to receiving the name from a user.

BRIEF DESCRIPTION OF THE DRAWINGS

FIGS. 3a and 3b are detailed diagrams of the smart contract computing system from FIG. 1, according to one embodiment.

DETAILED DESCRIPTION

Figure 1:
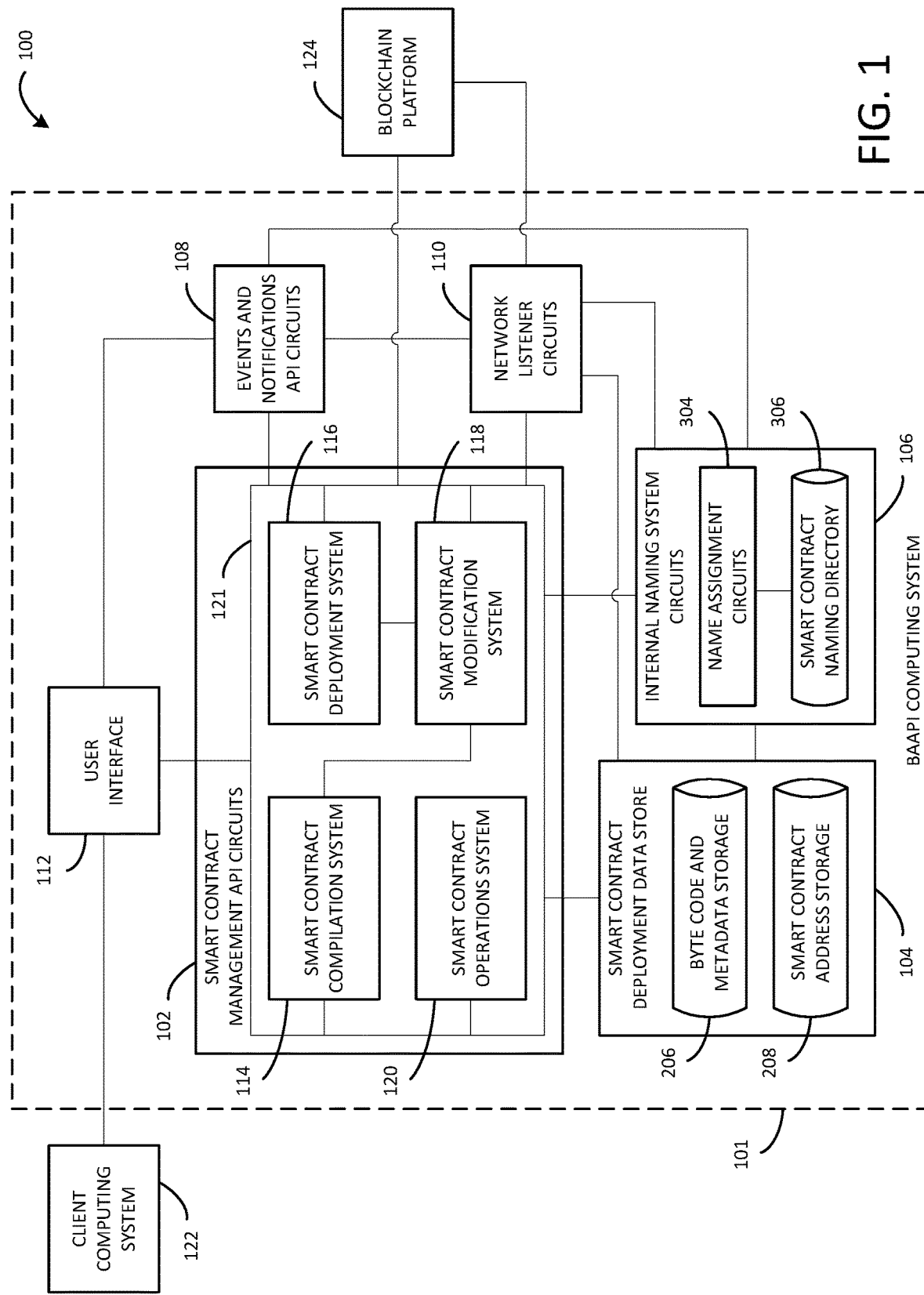
FIG. 1 is a diagram of a smart contract computing system, according to one embodiment.

A number of blockchain implementations or platforms exist that are capable of hosting smart contracts. In fact, in the past years, the number of blockchain implementations available for conducting financial transactions via smart contracts has greatly expanded. Blockchain platforms capable of running smart contracts include, for example, Bitcoin, Corda, Hyperledger, and Ethereum. Nevertheless, certain blockchain implementations are better suited to certain asset classes than others, which is relevant to financial transactions carried out by smart contract. As an example, for a cash transaction, a safe blockchain with a fast implementation and confirmation time is desirable. However, the same blockchain implementation may not be desirable for a securities clearing, which can handle a longer confirmation time and can require different (and typically larger) data storage requirements.

Additionally, different blockchain platforms have different requirements for deploying or running smart contracts thereon. For example, blockchain platforms may work best with certain coding languages, have certain transaction costs for using the blockchain platform, have certain compiling requirements, require the user to run a node of the platform's blockchain in order to use the blockchain, etc. These differing requirements make it difficult for developers to work with different blockchains, which may be problematic, for example, when the developer wants to conduct a financial transaction that requires the use of more than one blockchain. As such, an abstraction application program interface (API) that allows developers to more easily deploy, access, and manage smart contracts across different blockchain platforms would be beneficial.

Referring to the figures generally, systems, methods, and apparatuses for a smart contract blockchain abstraction application programming interface (BAAPI) are provided herein. According to the present disclosure, a user provides BAAPI with code defining the terms of a smart contract. BAAPI determines an optimal blockchain platform on which to deploy the smart contract and facilitates the deployment of the smart contract thereon. Once the smart contract has been deployed on the blockchain platform, BAAPI facilitates interactions between the user and the deployed smart contract, helping the user to access, modify, and perform operations on the smart contract. In this way, BAAPI provides a straightforward means by which a developer may deploy and manage a smart contract on any of a number of blockchain platforms.

The BAAPI system offers several technical advantages over conventional methods of deploying and managing smart contracts. For one, traditionally developers have needed to manually determine which blockchain platform to deploy a smart contract that they have created onto. For certain transactions this may be easy to determine, but for other transactions it may be more difficult, requiring the developer to take into account, e.g., the confirmation times of various blockchain platforms, the costs of deploying the smart contract onto various blockchain platforms, and so on. By contrast, the BAAPI system automatically determines the optimal blockchain platform for a given smart contract. As discussed in further detail below, BAAPI may determine the optimal blockchain platform based on the coding language used to create the smart contract, though it may also determine the optimal blockchain platform based on who will own the smart contract once deployed, how much deploying the smart contract on a given blockchain platform will cost, and so on. Additionally, the BAAPI system automatically compiles a smart contract received from a developer based on the coding language of the contract and/or the determined optimal blockchain platform, and the BAAPI system automatically deploys the received smart contract onto the blockchain platform in response to a command from the developer. Thus, a developer can submit a smart contract to the BAAPI system, which automatically determines the optimal blockchain platform for the smart contract, compiles the smart contract, and deploys the smart contract. Accordingly, the BAAPI system greatly simplifies the process of smart contract deployment for the developer over the current options available to the developer, which typically require the developer to research various blockchain platforms and may result in the developer not choosing the best blockchain platform for a given smart contract.

Moreover, managing a deployed smart contract can be difficult and time-consuming for developers. Developers may need to know the address (e.g., a string of alphanumeric characters) of the smart contract as deployed on the blockchain platform in order to modify the smart contract or perform operations embedded within the smart contract. They may further need to monitor the address of the smart contract on the blockchain platform to ensure that it has not changed; otherwise, if the address has changed without their knowledge, the developers will be unable to call up the smart contract, modify the smart contract, perform smart contract operations, and so on. Developers may also need to personally monitor the deployed smart contract and the blockchain platform it is deployed onto to determine whether modifications or operations have been successfully carried out. Furthermore, developers may need to be personally familiar with the operations embedded in their deployed smart contracts and/or operations allowed by the blockchain platforms the contracts are deployed onto, as well as their requirements, in order to perform said operations. To resolve these types of issues, the BAAPI system provides an abstraction level to developers that allows them to manage their deployed smart contracts in a much simpler and streamlined manner.

For example, rather than requiring the developer to store the address of a deployed smart contract and use the address to interact with the deployed smart contract, the BAAPI system may store the address of a deployed smart contract in association with a name for the smart contract. Accordingly, the developer is able to call up and interact with the deployed smart contract via the BAAPI system by the name, which may be much easier for the developer to remember than the address. Additionally, the BAAPI system may monitor the blockchain platform of the deployed smart contract and, in response to determining that the address of a deployed smart contract has changed, automatically update the stored address for the smart contract in the BAAPI system. In this way, the BAAPI system always identifies the correct address of the contract in response to receiving the name from the developer. As another example, the BAAPI system may monitor the blockchain platform for the results of modifications, operations, and other transactions related to the deployed smart contract and report back the results to the developer, obviating the need for the developer to personally monitor the blockchain platform.

As a further example, when the BAAPI system compiles a smart contract for deployment, the BAAPI system may store metadata relating to the smart contract, including relating to operations embedded in the smart contract and the requirements of those operations. The BAAPI system may also interface with the blockchain platform on which the smart contract is deployed such that the BAAPI system tracks the different operations available to the developer, as well as their requirements, through the blockchain platform. The BAAPI system may then expose the operations available to the developer through the deployed smart contract and the blockchain platform and determine whether inputs from the developer to perform one or more operations meet the requirements of those one or more operations. In this way, the BAAPI system helps developers successfully execute operations through the smart contract or the blockchain platform without requiring developers to have a high level of familiarity with said operations, saving developers time and, potentially, blockchain transaction costs. Thus, the BAAPI system interfaces with a deployed smart contract and the blockchain platform onto which it is deployed such that the BAAPI system streamlines how developers to manage their deployed smart contracts.

Additionally, as discussed above, some blockchain platforms are better suited to certain asset classes than others. Moreover, some blockchain platforms are associated with certain entities (e.g., financial institutions), some blockchain platforms may have certain transaction costs that may be preferable to a developer for certain applications, and so on. Accordingly, developers may want to use different blockchain platforms for different smart contracts, or developers may want to use a set of smart contracts that interact with each other across different blockchain platforms. Conventionally, to manage smart contracts deployed on different blockchain platforms, developers would have to be familiar with each platform, including the requirements and limitations of each. For example, to perform actions that would modify the blockchain of each blockchain platform, developers would have to separately pay the transaction costs associated with each blockchain platform or run a node of the blockchain for each blockchain platform that the developer wanted to use. Conversely, the BAAPI system is capable of interfacing with multiple blockchain platforms on the developer's behalf. As such, developers can send smart contracts to one source, BAAPI, and BAAPI can deploy the smart contracts onto various blockchain platforms. In doing so, BAAPI takes care of, for example, compiling the smart contract code such that the compiled code is compatible with the various blockchain platforms, paying the transaction costs associated with each of the various blockchain platforms, running nodes of the various blockchain platforms and so on. Thus, BAAPI provides a single interface to developers by which developers may deploy smart contracts onto a variety of blockchain platforms and subsequently interact with various smart contracts deployed on the variety of blockchain platforms.

Referring now to FIG. 1, a block diagram of a smart contract computing system 100 is shown according to one embodiment. The smart contract computing system 100 includes a BAAPI computing system 101, a client computing system 122, and at least one blockchain platform 124. As shown, the BAAPI computing system 101 includes smart contract management API circuits 102, a smart contract deployment data store 104, internal naming system circuits 106, events and notifications API circuits 108, network listener circuits 110, and a user interface 112. The smart contract management API circuits 102 further include a smart contract compilation system 114, a smart contract deployment system 116, a smart contract modification system 118, and a smart contract operations system 120. As shown in FIG. 1, the various components of the BAAPI computing system 101, as well as the components of the smart contract management API circuits 102 (i.e., the smart contract compilation system 114, the smart contract deployment system 116, the smart contract modification system 118, and the smart contract operations system 120), are connected to a box 121, which represents the various connections the components of the BAAPI computing system 101 have to the smart contract management API circuits 102 and vice versa, as described in further detail with respect to FIGS. 3a through 6b below. Additionally, as shown, the smart contract deployment data store 104 includes a byte code and metadata storage 206 and a smart contract address storage 208, and the internal naming system circuits 106 include name assignment circuits 304 and a smart contract naming directory 306.

A user may interact with the BAAPI computing system 101 shown in FIG. 1 as follows. A client computing system 122 operated by the user connects with the user interface 112, by which the user provides inputs to the BAAPI computing system 101. These inputs may include or relate to, e.g., smart contract code to be compiled and deployed, a modification to an existing smart contract deployed on a blockchain of a blockchain platform (e.g., blockchain platform 124), and/or an operation to be performed within a deployed smart contract or through the blockchain platform on which the smart contract is deployed. In various embodiments, the blockchain platform 124 includes a plurality of blockchain platforms. For example, in one embodiment, the blockchain platform 124 includes Corda, Ethereum, and Hyperledger. The user interface 112 then provides these inputs to the smart contract management API circuits 102.

In response to receiving the user inputs, the smart contract management API circuits 102 may interact with internal components of the BAAPI computing system 101 to perform various actions based on those inputs. For example, the smart contract management API circuits 102 may, e.g., interact with the smart contract deployment data store 104, the internal naming system circuits 106, and/or the network listener circuits 110 regarding the user inputs. As an example, in response to the user inputs, the smart contract management API circuits 102 may examine metadata relating to a compiled smart contract in the smart contract deployment data store 104. As another example, the smart contract management API circuits 102 may look up in the internal naming circuits 106 a name associated with a smart contract deployed on a blockchain. As a third example, the smart contract management API circuits 102 may have the network listener circuits 110 verify that a smart contract is still running on a particular blockchain platform 124 before the smart contract management API circuits 102 carry out operations associated with the smart contract. Moreover, the smart contract management API circuits 102 may, in response to the user inputs, perform actions internally. For example, the smart contract compilation system 114, the smart contract deployment system 116, the smart contract modification system 118, and/or the smart contract operations system 120 may interact with each other to perform various actions based on the user inputs.

Additionally, in response to the user inputs, the smart contract management API circuits 102 may interact with a blockchain platform 124. In various embodiments, the smart contract management API circuits 102 facilitate the deployment of smart contract code that has been compiled by the smart contract management API circuits 102 onto the blockchain platform 124, as well as the management of smart contracts deployed to the blockchain platform 124. The interactions of the smart contract API circuits 102 with the other components of the BAAPI computing system 101 and the smart contract computing system 100 (e.g., the blockchain platform 124) are described in more detail below with regard to the subsequent figures.

The network listener circuits 110 monitor the blockchain platform 124 to determine the status of smart contracts deployed to the blockchain platform 124, the results of modifications made to existing smart contracts deployed to the blockchain platform 124, the results of operations executed by smart contracts deployed to the blockchain platform 124, etc. The network listener circuits 110 may further interact with internal components of the BAAPI computing system 101 in response to alerts, notifications, data, information, status updates, etc. received from the blockchain platform 124. As an example, the network listener circuits 110 may receive an address of a smart contract deployed on the blockchain platform 124 and send the address to the internal naming system circuits 106, which may then assign a name to the address to allow for easy look-up of the deployed smart contract. As another example, the network listener circuits 110 may receive from the blockchain platform 124 an indication that the address of a deployed smart contract has changed and accordingly instruct the internal naming circuits 106 to update the assigned name/address association. As a third example, the network listener circuits 110 may receive from the blockchain platform 124 an indication that a smart contract deployed to the blockchain platform 124 has been modified and accordingly update metadata associated with the smart contract that is stored in the smart contract deployment data store 104. The functions of the network listener circuits 110, as well as its interactions with the other components of the smart contract computing system 100 and the BAAPI computing system 101, are also described in more detail below with regard to the subsequent figures.

The events and notifications API circuits 108 provide outputs in the form of notifications, alerts, results, data, status updates, etc. to the user interface 112, which interacts with the client computing system 122 to deliver these outputs to the user. The events and notifications API circuits 108 receive information to provide to the user from the smart contract management API circuits 102 and/or from the network listener circuits 110. As an example, the smart contract management API circuits 102 may send to the events and notifications API circuits 108 the result of an attempt to compile smart contract code. As another example, the network listener circuits 110 may receive a status of a smart contract deployed to the blockchain platform 124 and send that status to the events and notifications API circuits 108. The events and notifications API circuits 108 provide the result of the compilation attempt from the smart contract management API circuits 102, the status of the deployed smart contract from the network listener circuits 110, etc. to the user by providing these outputs to the user interface 112 in communication with the client computing system 122. In this way, the user may receive information about smart contracts compiled, deployed, managed, etc. through the smart contract computing system 100.

Figure 2:
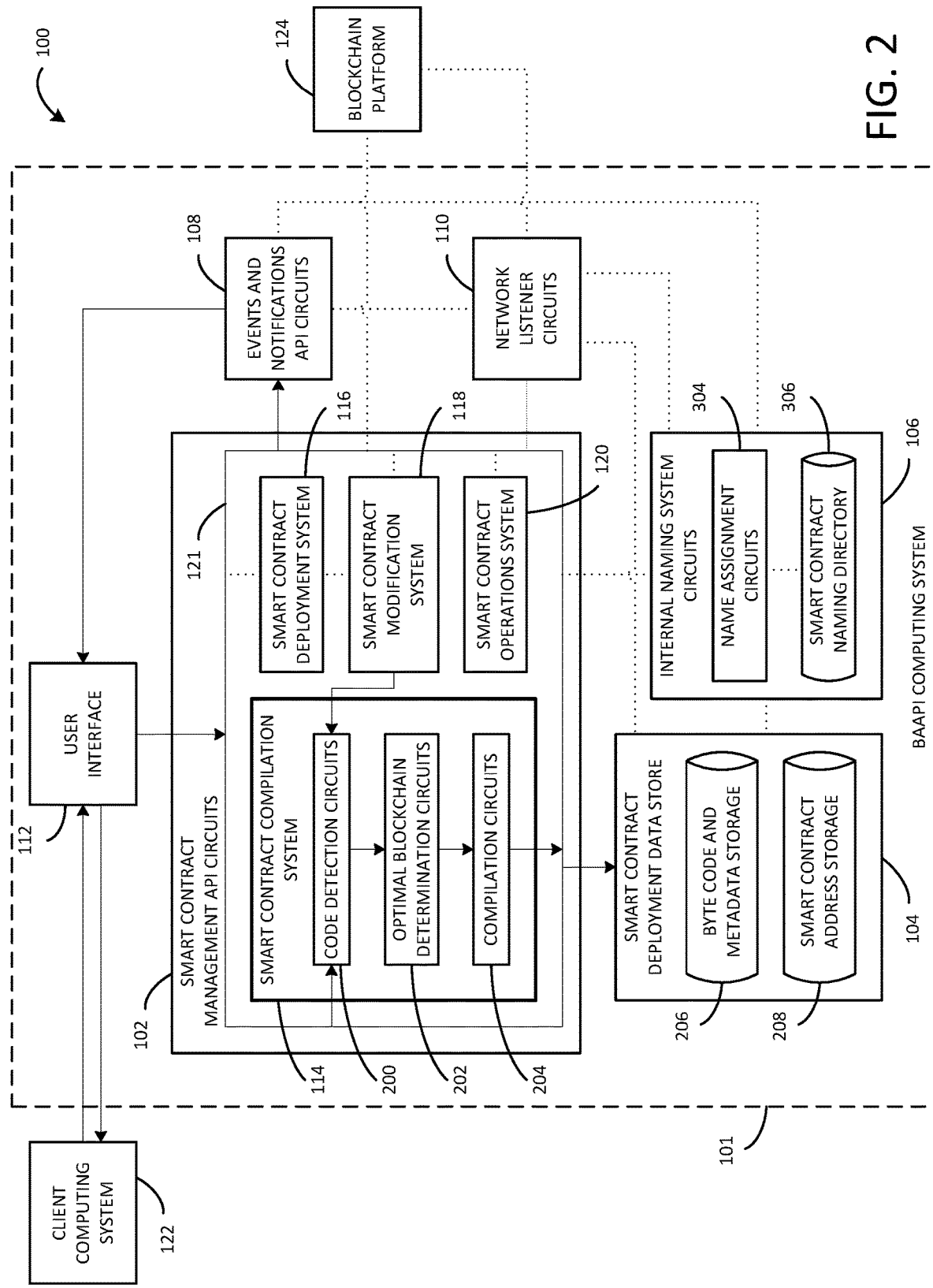
FIG. 2 is a detailed diagram of the smart contract computing system from FIG. 1, according to one embodiment.

Referring now to FIG. 2, a block diagram of the smart contract computing system 100 is shown illustrating the smart contract compilation system 114 in further detail, according to an embodiment. As shown in FIG. 2, the smart contract compilation system 114 includes code detection circuits 200, optimal blockchain determination circuits 202, and compilation circuits 204. The solid arrows in FIG. 2 illustrate the flow of data in relation to the smart contract compilation system 114, and the dotted lines in FIG. 2 illustrate connections that are not active in relation to the smart contract compilation system 114, according to the embodiment of FIG. 2.

The smart contract compilation system 114 is configured to determine the optimal blockchain platform for a smart contract received from a user and compile smart contract code for deployment to that platform. The BAAPI computing system 101 receives various inputs from users via the user interface 112, such as code defining terms of a smart contract. The smart contract may be written in one of a plurality of code languages, such as Solidity, Java, Go, Kotlin, etc. In some embodiments, the input may also include a call name for the smart contract code, which the user intends to be associated with the smart contract. In response to receiving the smart contract code, the BAAPI computing system 101 sends the code to the code detection circuits 200 of the smart contract compilation system 114. The code detection circuits 200 are configured to examine the smart contract code and determine which code language the code was written in. After the code detection circuits 200 make this determination, the optimal blockchain determination circuits 202 determine which blockchain platform, from a plurality of blockchain platforms, would be the best, or optimal, blockchain platform for deploying the smart contract onto.

In one embodiment, the optimal blockchain determination circuits 202 determine the optimal blockchain platform based at least partially on the code language detected by the code detection circuits 200, as certain code languages may be associated with certain blockchain platforms. In some situations, or in some embodiments, this determination may be based entirely on the code language. For example, the optimal blockchain determination circuits 202 may determine that Ethereum is the optimal blockchain platform for a smart contract written in Solidity. As another example, the optimal blockchain determination circuits 202 may determine that Corda is the optimal blockchain platform for a smart contract written in Kotlin.

In other embodiments, the optimal blockchain determination circuits 202 may make the optimal blockchain determination based at least partially on the code language as well as on a structure of an owner address for the smart contract. As an example, the optimal blockchain determination circuits 202 may find that, based on the programming code language of the smart contract alone, two or more blockchain platforms would be equally optimal for the smart contract. However, the optimal blockchain determination circuits 202 may have also been provided, in the user inputs, with an address or well-known name the smart contract should be owned by once deployed. Based on the structure of the address or the well-known name, the optimal blockchain determination circuits 202 may identify a blockchain platform associated with the address or the name, as well as the code language, and determine that blockchain platform to be the optimal blockchain platform. Alternatively, the optimal blockchain determination circuits 202 may identify a network associated with the address or name and determine which, of the two or more potential blockchain platforms, is optimal for that network.

In other embodiments, the optimal blockchain determination circuits 202 may, additionally or alternatively, make the blockchain determination based on a cost of deploying the smart contract onto a particular blockchain platform. For instance, the optimal blockchain determination circuits 202 may find that two or more blockchain platforms would be equally optimal for a smart contract based on the code language of the smart contract code alone. In that situation, the optimal blockchain determination circuits 202 may determine that deploying the smart contract onto a particular blockchain platform of the two or more platforms would be the most cost-effective option, and choose that blockchain as the optimal blockchain platform. For example, different blockchain platforms may have different transaction fees. The transaction fees may be represented in terms of a currency utilized by the respective blockchain (e.g., 0.0001 XBT), or may be defined by an amount of processing power required to operate a consensus algorithm. As an example, in some embodiments, one of the blockchain platforms may be a permissioned ledger that does not require a complicated consensus mechanism. Accordingly, deploying a smart contract onto the permissioned ledger may be more cost effective than deploying the smart contract onto a permissionless ledger.

In response to the optimal blockchain determination circuits 202 selecting an optimal blockchain platform, the compilation circuits 204 attempt to compile the code defining the terms of the smart contract. The compilation circuits 204 may select a compiler for the smart contract code based on the programming language of the code, as determined by the code detection circuits 200, and/or based on the optimal blockchain platform, as determined by the optimal blockchain determination circuits 202. If the attempt to compile the code is successful, the compilation circuits 204 store byte code produced from the compilation in the byte code and metadata storage 206. The compilation process may also produce metadata about the smart contract byte code to the smart contract code. This metadata may include, for example, operations defined in the smart contract code. The compilation circuits 204 may thus store the metadata and the byte code in the byte code and metadata storage 206. If the user has provided a call name for the smart contract code, the BAAPI computing system 101 may also include an association between the smart contract byte code and metadata and the user-provided call name for the smart contract in the byte code and metadata storage 206.

In various embodiments, the smart contract computing system 100 may make the metadata of the byte code and metadata storage 206 public, while keeping private the smart contract code and the smart contract byte code. This may allow, for example, the names of a plurality of operations defined in the smart contract to be public, while keeping the underlying code secret and thus more secure. For example, in some embodiment, the byte code and metadata storage 206 is a cloud database that is accessible over the internet. In one embodiment, the smart contract code, the smart contract byte code, and the metadata may all be included in a private registry (e.g., only an authorized user can access some or all of the private registry). The metadata of the private registry then maps to a public registry that is accessible by all users. In another embodiment, the metadata and the underlying code are both accessible via a cloud database, but the underlying code is password protected. In other embodiments, the byte code and metadata storage 206 is implemented via a blockchain-based system (e.g., via the blockchain platform 124 or via another blockchain platform). One or both of the metadata and the underlying code may be stored on a blockchain. In one embodiment, the underlying code is cryptographically protected. In various embodiments, the smart contract computing system 100 may, additionally or alternatively, provide an option to the user to make some, all, or none of the information of a given smart contract available to the public.

Once the compilation of the smart contract code has been attempted, the compilation circuits 204 may also provide a notification to the events and notifications API circuits 108, which then pass that notification to the client computing system 122 via the user interface 112. If the compilation was successful, the notification may indicate the success of the compilation. Alternatively, if the compilation was not successful, the compilation circuits 204 may provide a notification to the events and notifications API circuits 108 indicating that the compilation failed, and the events and notifications API circuits 108 may pass the message to the user via the user interface 112 in communication with the client computing system 122.

Figure 3B:
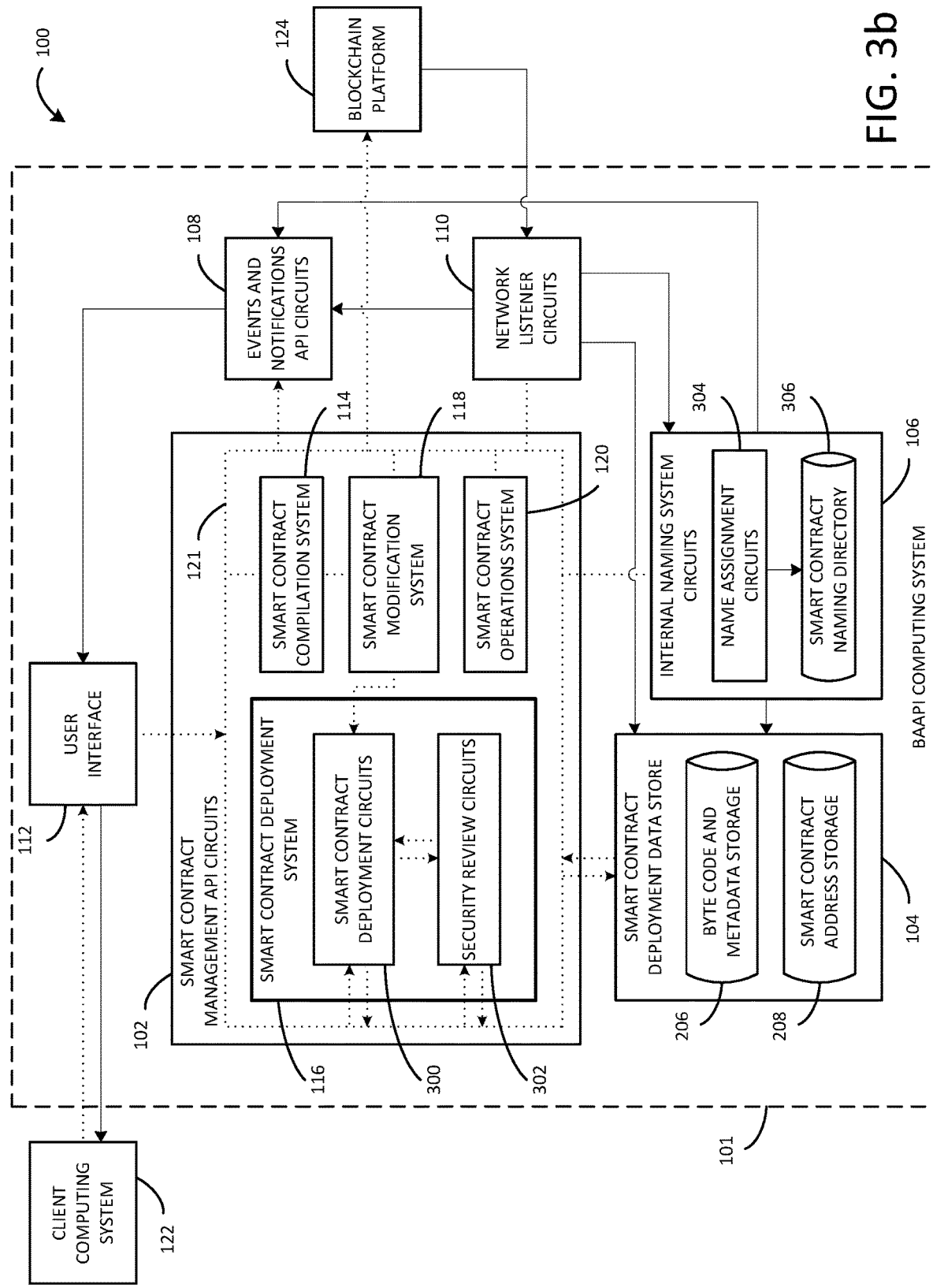

Referring now to FIGS. 3a and 3b, block diagrams of the smart contract computing system 100 are shown illustrating the smart contract deployment system 116 in further detail, according to one embodiment. As shown in FIGS. 3a and 3b, the smart contract deployment system 116 includes smart contract deployment circuits 300 and security review circuits 302. The solid and dotted arrows in FIGS. 3a and 3b illustrate the flow of data in relation to the smart contract deployment system 116, and the dotted lines in FIGS. 3a and 3b illustrate connections that are not active in relation to the smart contract deployment system 116, according to the embodiment of FIGS. 3a and 3b. More specifically, FIG. 3a shows the flow of data in relation to the smart contract deployment system 116 before a given smart contract is deployed (i.e., through the solid arrows in FIG. 3a). FIG. 3b shows the flow of data in relation to the smart contract deployment system 116 after a given smart contract is deployed (i.e., through the solid arrows in FIG. 3b).

As shown in FIG. 3a, the smart contract deployment circuits 300 are configured to deploy smart contract byte code stored in the byte code and metadata storage 206 in response to a command or instruction, from a user, to deploy the smart contract. The smart contract deployment circuits 300 may receive this instruction to deploy the smart contract directly from the user, via the client computing system 122 and the user interface 112, or indirectly from the user, via the smart contract modification system 118 as described in more detail below with respect to FIG. 5. In some embodiments, if the user previously provided the BAAPI computing system 101 with a call name for the smart contract, the user may identify the smart contract the user wants deployed by the call name.

In response to receiving an instruction to deploy smart contract code, the smart contract deployment circuits 300 may first notify the security review circuits 302 to review the smart contract byte code. Accordingly, the security review circuits 302 may identify the byte code to be deployed and/or the related metadata in the byte code and metadata storage 206 (e.g., by the call name for the smart contract provided by the user), and review the byte code to be deployed and/or the related metadata for security weaknesses. Upon finding one or more security weaknesses, the security review circuits 302 may perform actions to prevent the smart contract byte code from being deployed. For example, the security review circuits 302 may alert the smart contract deployment circuits 300 to abort the deployment of the smart contract. Alternatively, or additionally, the smart contract deployment circuits and/or the security review circuits 302 may send an alert to the events and notifications API circuits 108 to pass on to the user, notifying the user of the one or more security weaknesses. However, upon finding no security weaknesses, the security review circuits 302 may notify the smart contract deployment circuits 300 to proceed with the smart contract deployment.

In various embodiments, the smart contract computing system 100 may further include or be connected to a test network (not shown in FIG. 3*a* or FIG. 3*b*). The test network may be configured to "test" the smart contract byte code to determine whether the smart contract byte code will successfully deploy on the optimal blockchain platform. In one embodiment, the test network may be an isolated, private test network (i.e., a test network that is not connected to a blockchain platform or to any other network). The smart contract byte code may be deployed on the first test network, e.g., to make sure that the byte code deploys without any errors, to make sure that the smart contract as deployed correctly interacts with other smart contracts, etc. In another embodiment, the test network may be a staging environment that the smart contract byte code may be deployed on to determine whether the smart contract works in an properly configured environment specific to the optimal blockchain platform for the smart contract. When deployed on the staging environment, the test network may name the deployed smart contract on the staging environment to designate that the contract is being staged (e.g., staging-[contract name]). In another embodiment, the test network may be a pilot channel. The pilot channel may be similar to the staging network, except that the smart contracts deployed on the pilot channel may be registered on a global registry, allowing other users or institutions to see the smart contracts deployed on the pilot channel and call them. In yet another embodiment, the test network may include any combination of an isolated, private test network, a staging environment, and a pilot channel.

In various embodiments, the user, or another individual or institution the user gives permission to, may test the smart contract byte code on a test network. In other embodiments, the BAAPI computing system 101 may, additionally or alternatively, test the smart contract byte code on the test network. Moreover, in at least some embodiments, results of the smart contract byte code testing on the test network may be cached (e.g., in the byte code and metadata storage 206), and the security review circuits 302 may only proceed with reviewing the smart contract byte code for security weaknesses if the security review circuits 302 determine that the smart contract byte code has been successfully tested on a test network. Alternatively or additionally, the smart contract deployment circuits 300 may only proceed with the deployment of the smart contract if the smart contract deployment circuits 300 determine that the smart contract byte code has been successfully tested on a test network. If the smart contract byte code has not been successfully tested on a test network, the BAAPI computing system 101 may take steps to ensure that the byte code is successfully tested before deployment. For example, the smart contract deployment circuits 300 and/or the security review circuits 302 may send the byte code to be tested on a test network, the smart contract deployment circuits 300 and/or the security review circuits 302 may send the user a message (e.g., via the events and notifications API circuits 108) indicating that the user needs to successfully test the smart contract byte code before the BAAPI computing system 101 will proceed with deployment, and so on.

If the smart contract deployment circuits 300 and/or the security review circuits 302 do not find the smart contract byte code to be deficient in any way, the smart contract deployment circuits 300 proceed with the deployment process. Accordingly, the smart contract deployment circuits 300 first identify the smart contract byte code that was compiled and stored in the byte code and metadata storage 206, as described above with respect to FIG. 2. For example, the smart contract deployment circuits 300 may use the call name for the smart contract provided by the user to find the smart contract byte code associated with the call name in the byte code and metadata storage 206. In some embodiments, before attempting to deploy the smart contract byte code, the smart contract deployment circuits 300 may further identify the stored metadata associated with the smart contract byte code and verify with the stored metadata whether the instruction to deploy the smart contract code sent by the user meets requirements, defined in the metadata, for deploying the smart contract code. If the instruction does meet the requirements, the smart contract deployment circuits 300 continues with the deployment of the smart contract. However, if the instruction does not meet the requirements, the smart contract deployment circuits 300 may abort the attempt to deploy the smart contract and/or notify the user via the events and notifications API 108 that deployment instruction is deficient.

Subsequently, assuming that smart contract deployment system 114 finds the smart contract byte code fit for deployment, the smart contract deployment circuits 300 retrieve the smart contract byte code from the byte code and metadata storage 206 and facilitate the deployment of the smart contract byte code onto the optimal blockchain platform 124 determined by the optimal blockchain determination circuits 202. The smart contract deployment circuits 300 may send the smart contract byte code to the blockchain platform 124 along with any payment required by the blockchain platform 124 (e.g., Bitcoins, Ether, etc.). In one embodiment, in response to sending the smart contract byte code to the blockchain platform 124, the BAAPI computing system 101 may ask the user via the user interface 112 to provide payment information for deploying the smart contract onto the blockchain platform 124. In another embodiment, the user may subscribe to a smart contract management service for the BAAPI computing system 101, which includes a certain number or amount of deployment payments to various blockchain platforms.

As shown in FIG. 3*b*, the network listener circuits 110 of the BAAPI computing system 101 continuously monitor the blockchain platform 124 for confirmations, changes, modifications, updates, executions, etc. of smart contracts whose deployments were facilitated by the BAAPI computing system 101. As such, assuming the smart contract byte code is successfully deployed to the blockchain platform 124, the network listener circuits 110 may receive a confirmation of the deployment from the blockchain platform 124. The network listener circuits 110 may further receive an address of the smart contract as deployed on the blockchain of the blockchain platform 124, the address identifying the location of the smart contract on the blockchain.

Since such addresses are typically strings of alphanumeric characters, it may be advantageous to a developer to be able to assign a "common" name (i.e., a recognizable name, as opposed to a string of meaningless characters) to the deployed smart contract by which the developer may, for example, later call the deployed smart contract via the BAAPI computing system 101. As such, the network listener circuits 110 may provide the address of the deployed smart contract to the name assignment circuits 304 of the internal naming system circuits 106. The name assignment circuits 304 assign this common name to the address of the deployed smart contract by which the deployed smart contract may henceforth be known internally within the BAAPI computing system 101. The name may further be provided to the user through the events and notifications API circuits 108. In one embodiment, the assigned name may be selected by the BAAPI computing system 101 and later provided to the user via the events and notifications API circuits 108. In another embodiment, the name may be provided by the user via the user interface 112 prior to the assignment of the name by the name assignment circuits 304, and the events and notifications API circuits 108 may provide a confirmation of the name assignment to the user. In this way, the user may subsequently call, manage, execute operations on, etc. the deployed smart contract by the assigned name, rather than by the alphanumeric address. Once the common name is assigned to the address, the name and the address may be stored in the smart contract naming directory 306, and the association between the assigned name and the address may be provided to the smart contract address storage 208 in the smart contract deployment data store 104.

Assuming the deployment of the smart contract byte code is successful, the network listener circuits 110 may also update the smart contract byte code and metadata associated with the deployed smart contract in the byte code and metadata storage 206. For example, the network listener circuits 110 may update the metadata to include information regarding the successful deployment of the smart contract on the blockchain platform 124. The network listener circuits 110 may further provide one or more notifications to the events and notifications API circuits 108 regarding the successful deployment of the smart contract onto the blockchain platform 124. The events and notifications API circuits 108 then pass those notifications to the user via the user interface 112 connected to the client computing system 122.

However, if the deployment of the smart contract byte code to the blockchain platform 124 is unsuccessful, the blockchain platform 124 may instead provide the network listener circuits 110 with a notification of the failure to deploy the smart contract. In response to this notification, the network listener circuits 110 may update the associated smart contract byte code and metadata in the byte code and metadata storage 206 to reflect, for example, that an unsuccessful attempt to deploy the smart contract to the blockchain platform 124 has been made. The network listener circuits 110 may further provide one or more notifications to the events and notifications API circuits 108 to pass to the user regarding the failure to deploy the smart contract. In one embodiment, the one or more notifications may include information received by the network listener circuits 110 from the blockchain platform 124 on why the smart contract failed to deploy onto the blockchain platform 124.

In various embodiments, before or after the smart contract has been successfully deployed on the blockchain platform 124, the user may provide to the BAAPI computing system 101, by the user interface 112, an address of an individual, company, entity, etc. who is to own the deployed smart contract. In response to receiving this owner address, the BAAPI computing system 101 may assign the owner address as the owner of the deployed smart contract.

Figure 4:
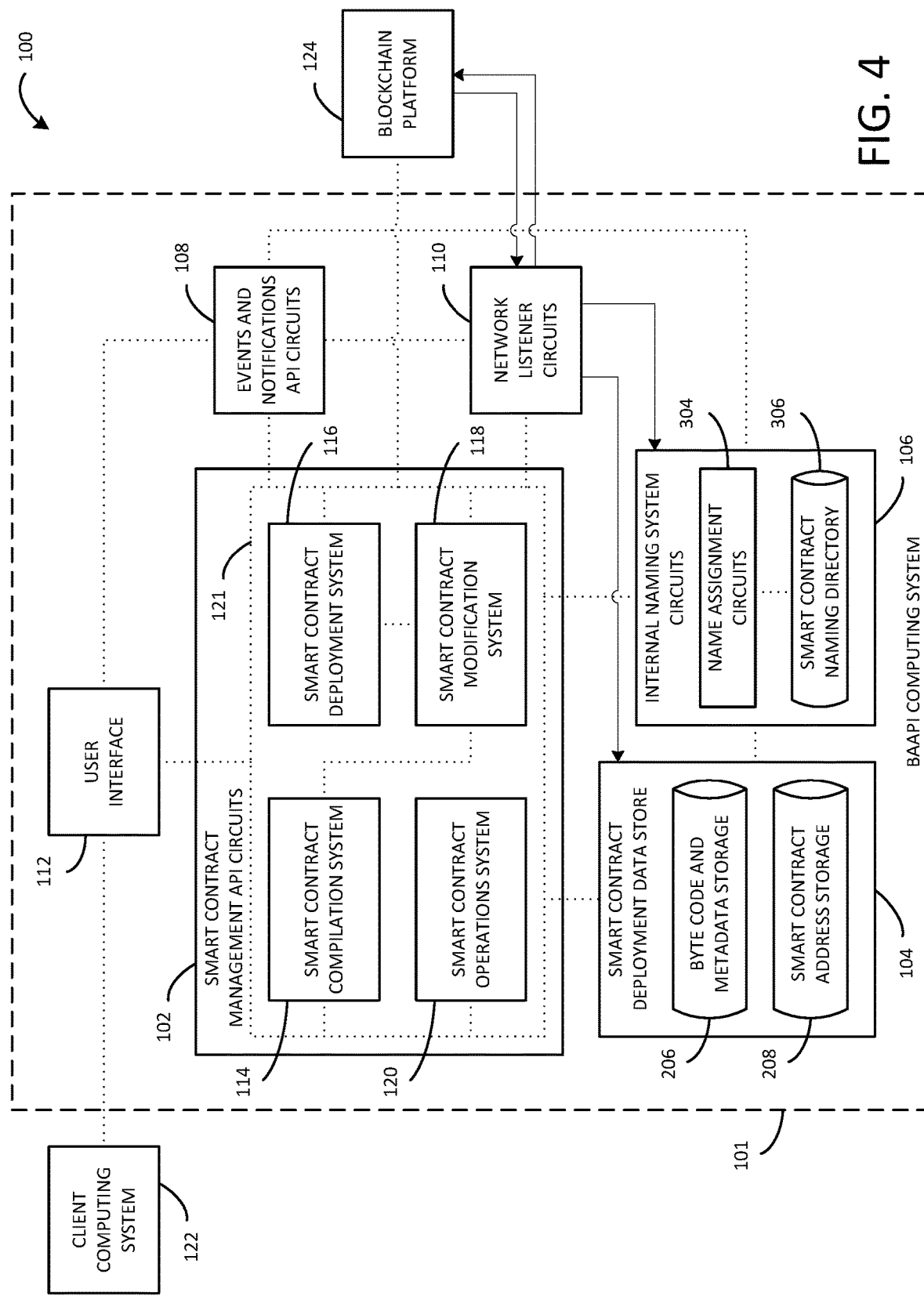
FIG. 4 is a detailed diagram of the smart contract computing system from FIG. 1, according to one embodiment.

Referring now to FIG. 4, a block diagram of the smart contract computing system 100 is shown illustrating further operations of the network listener circuits 102 according to one embodiment, following the deployment of a smart contract onto the blockchain platform 124. The solid arrows in FIG. 4 illustrate the flow of data in relation to the network listener circuits 110 after a smart contract has been deployed onto the blockchain platform 124, and the dotted lines shown in FIG. 4 illustrate connections that are not active in relation to the network listener circuits 110 after the smart contract deployment, according to the example embodiment of FIG. 4.

As shown, the network listener circuits 110 continue to monitor the blockchain platform 124 after the smart contract has been deployed. In various embodiments, the network listener circuits 110 monitor the blockchain platform 124 at least partially to detect changes to the address of the deployed smart contract on the blockchain of the blockchain platform 124. For example, a deployed smart contract may change addresses on the blockchain. This may occur when a deployed smart contract is confirmed on two different blocks of the blockchain and a block that was not the original block the smart contract was deployed onto is determined by the peer-to-peer network of the blockchain to be correct.

Accordingly, in that or similar situations, the network listener circuits 110 may receive a notification or indication from the blockchain platform 124 that the address of the deployed smart contract has changed. In response, the network listener circuits 110 may have the smart contract address storage 208 updated to reflect the association between the assigned name and the new address of the deployed smart contract. Additionally, the network listener circuits 110 may have the smart contract naming directory 306 updated to include the new address. Once the smart contract address storage 208 and the smart contract naming directory 306 are updated, the BAAPI computing system 101 is configured to identify the new address, instead of the original address where the smart contract was deployed, in response to receiving the name from the user. In this way, the BAAPI computing system 101 is always able to identify the current location of the deployed smart contract by the assigned name alone, even if the address of the deployed smart contract changes.

Figure 5:
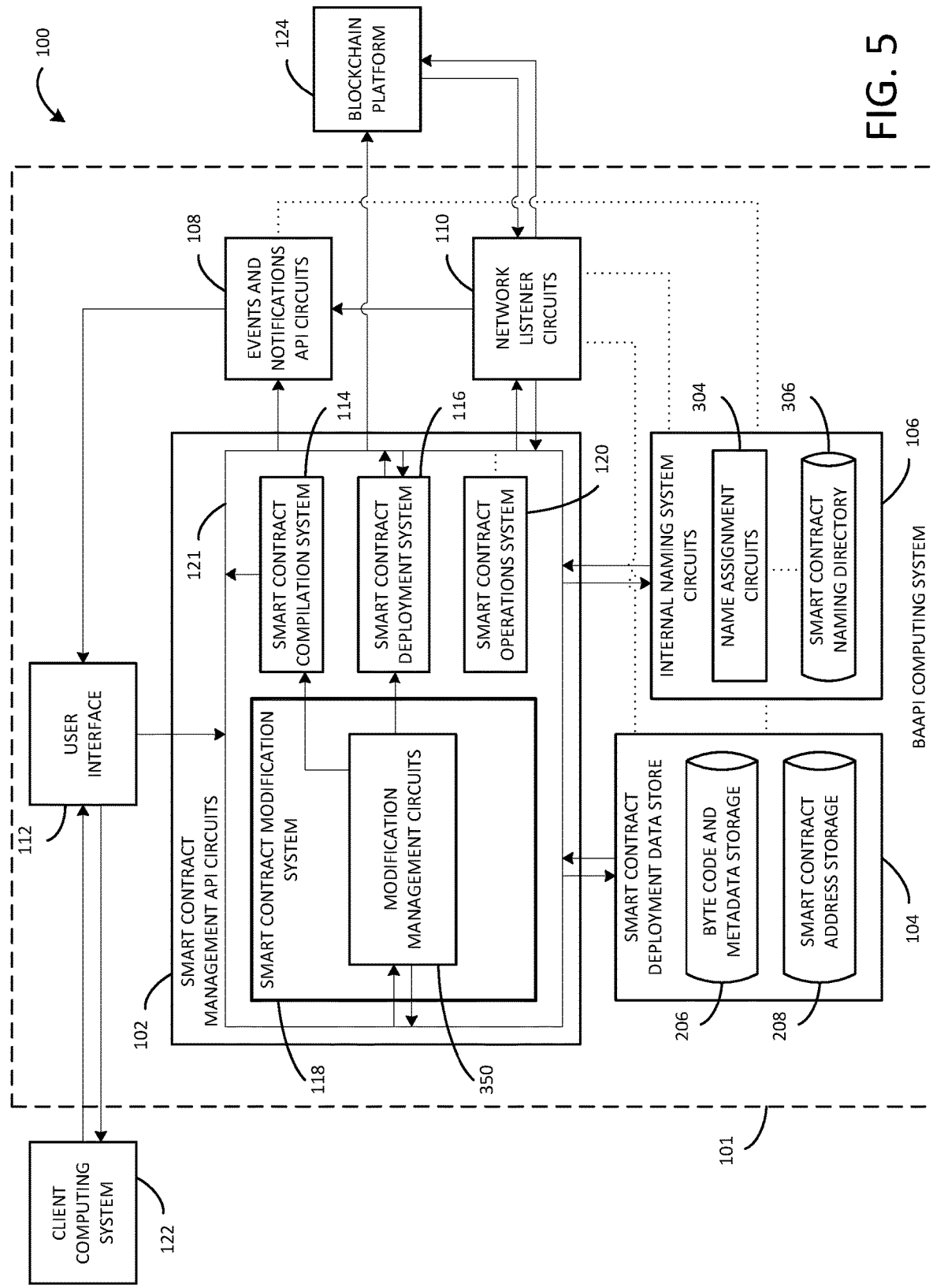
FIG. 5 is a detailed diagram of the smart contract computing system from FIG. 1, according to one embodiment.

Referring now to FIG. 5, a block diagram of the smart contract computing system 100 is shown illustrating the smart contract modification system 118 in further detail, according to one embodiment. As shown in FIG. 5, the smart contract modification system includes modification management circuits 350. Additionally, the solid arrows in FIG. 5 illustrate the flow of data in relation to the smart contract modification system 118, while the dotted lines in FIG. 5 illustrate connections that are not active in relation to the smart contract modification system 118.

The modification management circuits 350 of the smart contract modification system 118 are configured to modify a deployed smart contract in response to an input from the user via the user interface 112. As an example, an input from the user may identify a smart contract deployed on the blockchain platform 124 by its assigned name (i.e., instead of by the address of the smart contract as deployed to the blockchain platform 124), and include a command or instruction to modify the deployed smart contract with modifying smart contract code (e.g., code including modifications to the terms of the smart contract) provided by the user with the input. In response to receiving the modifying smart contract code, the modification management circuits 350 send the code to the smart contract compilation system 114. The smart contract compilation system 114 then compiles the smart contract modification code, e.g., using a compiler associated with the programming code of the smart contract modification code and/or associated with the blockchain the smart contract is deployed on, according to the compilation process described above with respect to FIG. 2. The smart contract compilation system 114 then stores the smart contract modification byte code and metadata produced from the compilation process in the byte code and metadata storage 206. In one embodiment, the smart contract modification byte code and metadata may be stored in the byte code and metadata storage 206 in association with the byte code and metadata for the unmodified smart contract code.

The modification management circuits 350 of the smart contract modification system 118 subsequently examine the smart contract naming directory 306 and the smart contract address storage 208 to identify the address of the smart contract based on the assigned name for the smart contract, provided by the user in the user's modification input. Once the modification management circuits 350 have identified the address of the contract, the modification management circuits 350 send an inquiry to the network listener circuits 110, with the identified address of the deployed smart contract, to verify whether the smart contract is still running on the blockchain of the blockchain platform 124. In response to this inquiry, the network listener circuits 110 monitor the blockchain platform 124 to identify the deployed smart contract, determine whether the smart contract is still running on the blockchain of the blockchain platform 124, and provide the status of the smart contract to the modification management circuits 350. The network listener circuits 110 may further provide the status to the user via the events and notifications API circuits 108. If the smart contract is still validly deployed and running on the blockchain platform 124, the modification management circuits 350 may continue with the steps described below. If the smart contract is no longer validly deployed and running on the blockchain platform 124, the modification management circuits 350 may abort the attempt to modify the smart contract.

Provided that the smart contract is still running on the blockchain, the modification management circuits 350 send a command to the smart contract deployment system 116 to deploy the smart contract modification byte code to the blockchain platform 124 on which the smart contract is deployed, so as to modify the terms of the deployed smart contract. The smart contract deployment system 116 may do this using a similar process to the deployment process described above with respect to FIGS. 3a and 3b. For example, the smart contract deployment circuits 300 may interact with the security review circuits 302 to identify one or more security weaknesses in the smart contract modification byte code; identify and retrieve the smart contract modification byte code stored in the byte code and metadata storage 206; and facilitate the deployment of the smart contract byte code onto the optimal blockchain platform 124.

Moreover, in various embodiments, the smart contract modification byte code may be tested prior to deployment, by either the BAAPI computing system 101 or a user, for predicted successful modification of the deployed smart contract through one or more test networks, analogous to the test networks described above. Similar to the deployment process described above with respect to FIGS. 3a and 3b, in some embodiments, the smart contract modification system 118 and/or the smart contract deployment system 116 may only allow for deployment of the smart contract modification byte code if the byte code has been successfully tested. If the smart contract modification byte code has not been tested, the smart contract modification system 118 and/or the smart contract deployment system 116 may, for example, test the smart contract modification byte code prior to deployment or notify the user via the events and notifications API circuits 108 that the smart contract modification byte code needs to be tested before the BAAPI computing system 101 will deploy the code.

Additionally, the network listener circuits 110 may perform similar functions in response to the deployment of the smart contract modification byte code as they do in response to the deployment of unmodified smart contract byte code, as described above with respect to FIGS. 3a and 3b. For instance, the network listener circuits 110 may monitor the blockchain platform 124 for a confirmation of the deployment of the smart contract modification byte code; update the smart contract byte code associated with the deployed and modified smart contract in the byte code and metadata storage 206; update the metadata associated with the smart contract in the byte code and metadata storage 206 (e.g., by updating the original metadata to include the metadata produced through the compilation of the smart contract modification code); and provide one or more notifications to the events and notifications API circuits 108 regarding the successful or failed deployment of the smart contract modification code.

Figure 6A:
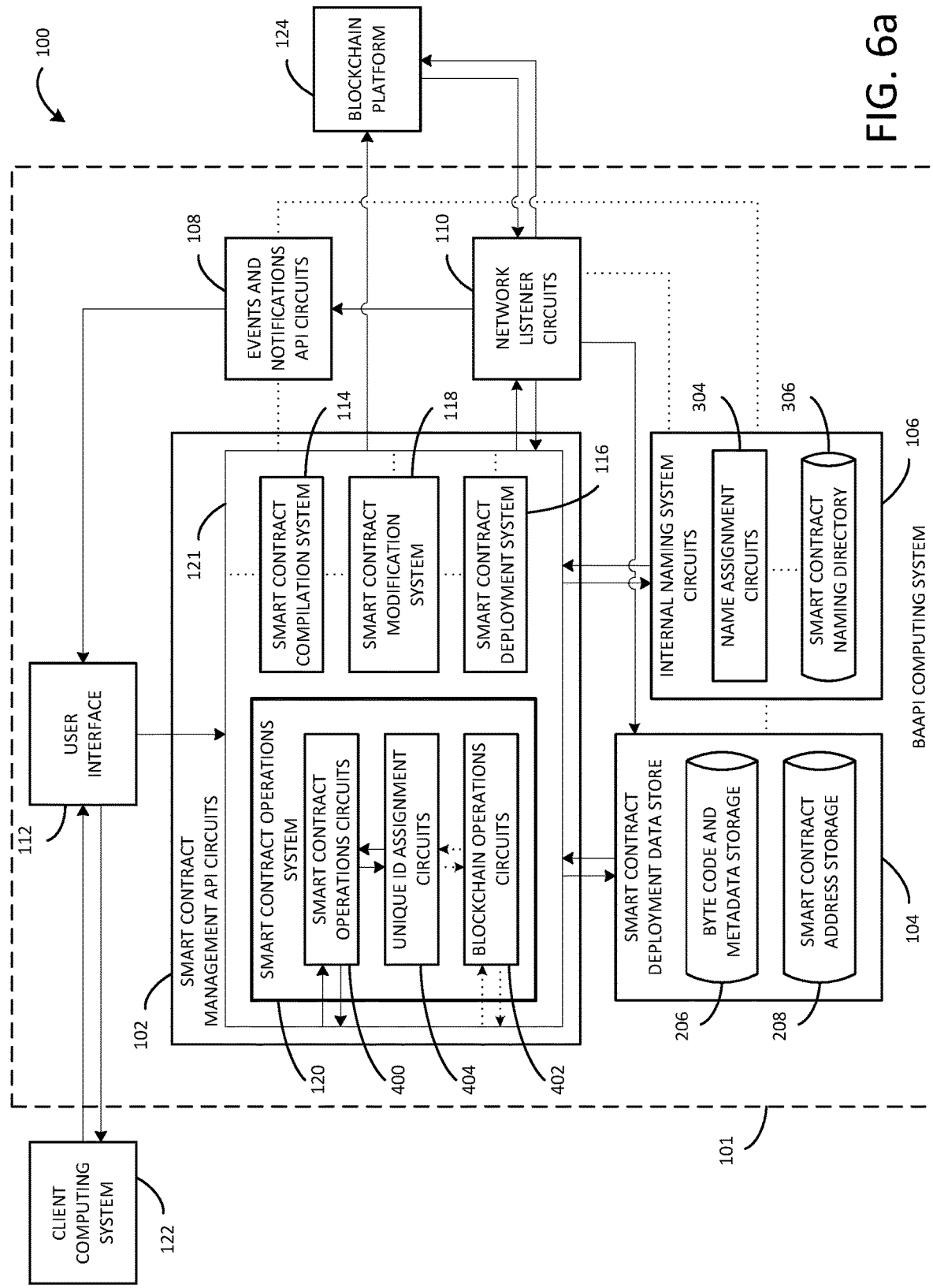
FIGS. 6a and 6b are detailed diagrams of the smart contract computing system from FIG. 1, according to one embodiment.
Figure 6B:
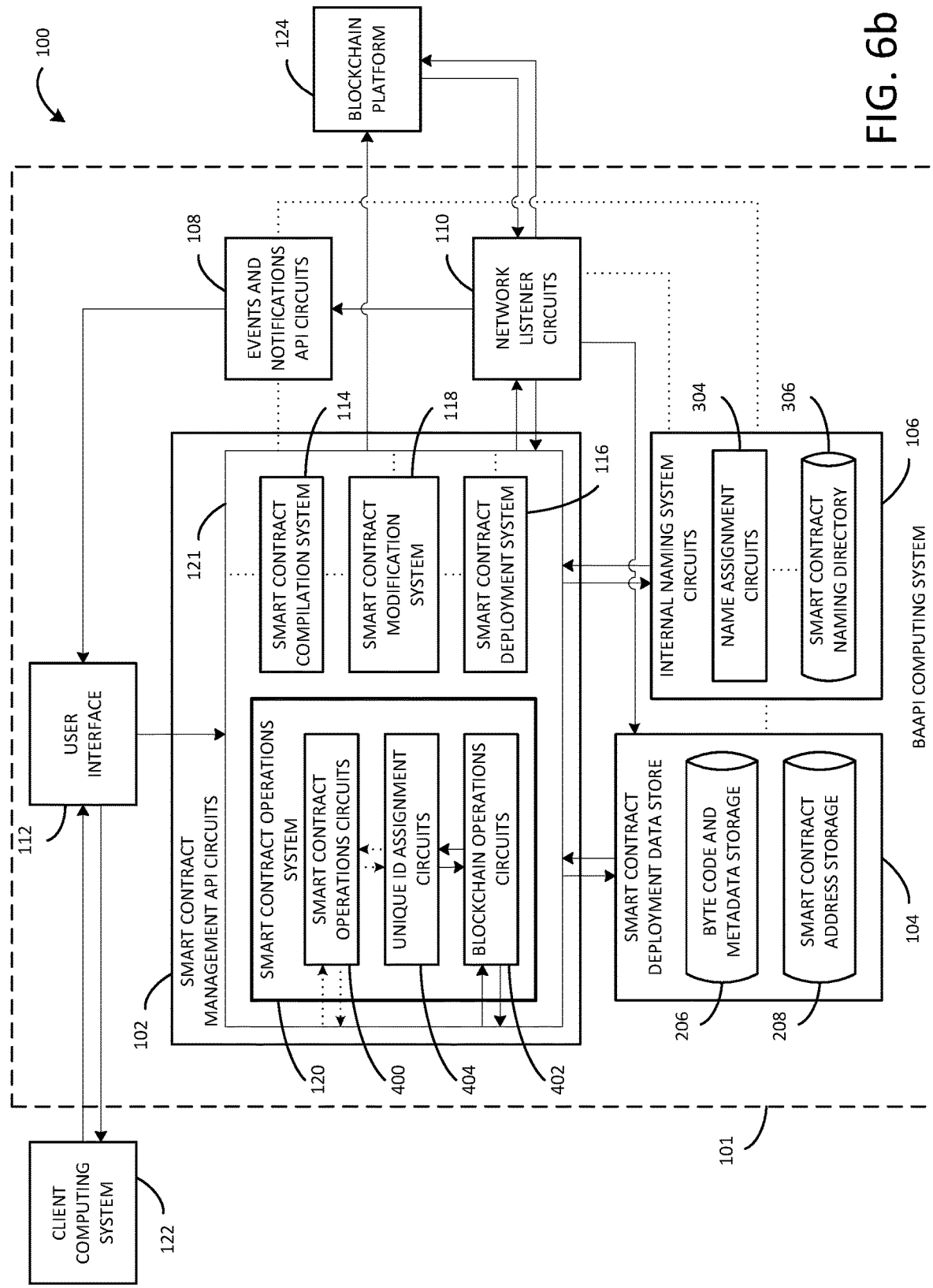

Referring now to FIGS. 6a and 6b, block diagrams of the smart contract computing system 100 are shown illustrating the smart contract operations system 120 in further detail, according to various embodiments. The solid and dotted arrows in FIGS. 6a and 6b illustrate the flow of data in relation to the smart contract operations system 120, and the dotted lines in FIGS. 6a and 6b illustrate connections that are not active in relation to the smart contract operations system 120. In various embodiments, one function of the smart contract operations system 120 is to allow a user to easily access and execute smart contract operations included and defined in a deployed smart contract. Additionally, in various embodiments, another function of the smart contract operations system 120 is to allow a user to easily access and execute operations defined by the blockchain platform 124 itself. The former function may be carried out by smart contract operations circuits 400, and the latter function may be carried out by blockchain operations circuits 402. Accordingly, FIG. 6a illustrates the process of carrying out a smart contract operation by the smart contract operations circuits 400 through the solid arrows shown in FIG. 6a, according to one embodiment. FIG. 6b illustrates the process of carrying out a blockchain operation by the blockchain operations circuits 402 through the solid arrows shown in FIG. 6b, according to one embodiment.

Referring first to FIG. 6a, the smart contract operations circuits 400 start the process of performing a smart contract operation in response to receiving an input, instruction, command etc. from the user via the user interface 112. The input instructs the BAAPI computing system 101 to perform an operation defined in smart contract code of a deployed smart contract (i.e., an operation encoded into a deployed smart contract). In some embodiments, the input or command may also identify the deployed smart contract by the assigned name for the smart contract, instead of by the address of the smart contract on the blockchain platform 124.

After receiving the input or command to execute the smart contract operation, the smart contract operations circuits 400 may interact with unique ID assignment circuits 404 to assign a unique identification to the input or command. This unique ID may, for example, allow the smart contract operations circuits 400 to order the input or command in a queue with other smart contract operation requests to be performed, with the smart contract operations circuits 400 performing the operations according to the queue order; provide an identification for the smart contract operation that the BAAPI computing system 101 may store in a history of smart contract operations performed by the user; and so on.

The smart contract operations circuits 400 then examine the smart contract address storage 208 and the smart contract naming directory 306 to identify the address of the deployed smart contract from the assigned name of the smart contract, e.g., provided by the user. Subsequently, the smart contract operations circuits 400 may use the assigned name to find the smart contract byte code and metadata associated with the deployed smart contract in the byte code and metadata storage 206. In some embodiments, the smart contract operations circuits 400 may use the associated metadata to verify that the operation to be performed is defined by the smart contract code of the deployed smart contract. In another embodiment, the smart contract operations circuits 400 may use the associated metadata to determine whether the operation will succeed if executed on the deployed smart contract (e.g., whether the user has provided the necessary inputs as defined in the metadata to allow the operation to be successfully executed). In another embodiment, the smart contract operations circuits 400 may use the associated metadata to determine whether the operation will modify the blockchain the smart contract is deployed onto (i.e., require a change to the smart contract byte code deployed on the blockchain of the optimal blockchain platform 124), or whether the operation will perform an action internal to the deployed smart contract (i.e., not require a change to the smart contract byte code deployed on the blockchain of the optimal blockchain platform 124).

Before facilitating the execution of the operation, the smart contract operations circuits 400 may interact with the network listener circuits 110 to identify the deployed smart contract (i.e., by the smart contract's address) and verify that the smart contract is still running on the blockchain platform, similar to the process described above with respect to FIG. 5. If the smart contract is no longer running on the blockchain platform 124, the smart contract operations circuits 400 may abort the attempt to execute the operation, and the network listener circuits 110 may send a notification indicating the same to the events and notifications API circuits 108 to be provided to the user. If, on the other hand, the smart contract is still running on the blockchain platform 124, the smart contract operations circuits 400 may proceed with executing the smart contract operation.

Having performed the aforementioned steps, the smart contract operations circuits 400 interacts with the blockchain platform 124 to facilitate the execution of the smart contract operation requested by the user. After the operation is executed, the network listener circuits 110 monitor the blockchain of the blockchain platform 124 to determine an outcome of the operation. In one embodiment, the network listener circuits 110 may monitor the blockchain to determine whether the operation was successful. In another embodiment, the network listener circuits 110 may monitor the blockchain of the blockchain platform 124 to determine a value, a status, data, or other information produced by the successful execution of the operation. In another embodiment, in response to the smart contract operations circuits 400 determining that the operation will modify the blockchain, the network listener circuits 110 may monitor the blockchain for a confirmation or an error of the operation, to determine a change in the smart contract byte code on the blockchain of the blockchain platform 124, and so on.

The network listener circuits 110 may update the associated smart contract byte code and metadata in the byte code and metadata storage 206 with the results of the monitoring regarding the executed operation. For example, the network listener circuits 110 may update the metadata associated with the deployed smart contract with a status of the executed operation (e.g., a confirmation or an error of the operation). The network listener circuits 110 may further provide a notification, information, data, etc. to the events and notifications API circuits 108, to be returned to the user via the user interface 112, based on the results of the executed operation as determined by the network listener circuits 110.

Referring now to FIG. 6b, a block diagram of the smart contract computing system 100 illustrating the process of performing a blockchain operation by the blockchain operations circuits 402 of the smart contract operations system 120 is shown, according to one embodiment. In various embodiments, the BAAPI computing system 101 may be configured to expose a plurality of blockchain operations, defined by the blockchain platform 124, to the user. One or more of the exposed operations may be specific to the blockchain platform 124, and/or one or more of the exposed operations may be common to a plurality of blockchain platforms including the blockchain platform 124. The blockchain operations circuits 402 may receive an instruction, command, input, etc. from the user via the user interface 112 requesting that the BAAPI computing system 101 perform one or more of these blockchain operations. In some embodiments, the blockchain operations circuits 402 may need to "translate" the blockchain operation requested by the user to be compatible with the optimal blockchain platform 124 before executing the operation. For example, if the user instructs the BAAPI computing system 101 to perform an operation common to multiple blockchain platforms, the blockchain operations circuits 402 may have to determine which call will perform that operation on the optimal blockchain platform 124 and then execute that call to perform the requested operation on the blockchain platform 124. Moreover, in some embodiments, the blockchain operations circuits 402 may assign a unique ID to the blockchain operation request similar to the unique IDs assigned to smart contract operations requests as described above with respect to FIG. 6a.

In various embodiments, the requested operation may be relate to a smart contract deployed to the blockchain platform 124, and the user may identify the deployed smart contract by the assigned name of the smart contract (i.e., as opposed to the address of the deployed smart contract on the blockchain of the blockchain platform 124). Accordingly, the blockchain operations circuits 402 may examine the smart contract address storage 208 and the smart contract naming directory 306 to determine the address of the deployed smart contract from the assigned name provided by the user. Subsequently, the blockchain operations circuits 402 may interact with the network listener circuits 110 to determine whether the smart contract is still running on the blockchain platform 124, similarly to the process described above with respect to FIG. 5. If the smart contract is no longer running on the blockchain platform 124, the blockchain operations circuits 402 may abort the attempt to execute the operation, and the network listener circuits 110 may send a notification indicating the same to the events and notifications API circuits 108 to be provided to the user. If, on the other hand, the smart contract is still running on the blockchain platform 124, the blockchain operations circuits 402 may proceed with executing the smart contract operation.

After performing the aforementioned steps, the blockchain operations circuits 402 interact with the blockchain platform 124 to facilitate the execution of the blockchain operation requested by the user. The network listener circuits 110 monitor the results of the execution of the blockchain operation, similar to the manner in which the network listener circuits 110 monitor the results of the execution of a smart contract operation, as described above with respect to FIG. 6a. As discussed, in some embodiments, the blockchain operation may modify or otherwise affect a deployed smart contract on the blockchain. In that case, the network listener circuits 110 may update the associated byte code and metadata in the byte code and metadata storage 206 according to the results of the executed blockchain operation and smart contract modifications. In other embodiments, the blockchain operation does not alter the blockchain on which the smart contract is deployed. In that case, the network listener circuits 110 may update the associated byte code and metadata with results of just the blockchain operation. Additionally, the network listener circuits 110 may provide a notification, an alert, a value, a status, data, information, etc. to the events and notifications API circuits 108, in response to results of the blockchain operation, which the events and notifications API circuits 108 provides to the user via the user interface 112.

In some embodiments, executing a blockchain operation by the smart contract operations circuits 400 and/or the blockchain operations circuits 402 may allow for complicated financial transactions to be conducted by smart contracts via interactions between more than one smart contract. For example, a first smart contract deployed on the blockchain of the blockchain platform 124 may include terms configuring it to interact with a second smart contract deployed on a second blockchain of a second blockchain platform. Executing a blockchain operation requested by the user may cause the first smart contract to interact with the second smart contract to perform a transaction. For instance, this may allow the client to create an escrow transaction via the smart contracts, with one smart contract triggering the sending of funds to an escrow account while the other smart contract triggers the sending of ownership of a security. The network listener circuits 110 may monitor both blockchain platforms to determine the results of the executed blockchain operation, as well as the results of the interactions between the smart contracts. The network listener circuits 110 may subsequently provide these results to a user via, e.g., the events and notifications API circuits 108.

As discussed above, in various embodiments, the smart contract computing system 100 is configured to perform the functions described herein by running a blockchain abstraction API, or BAAPI, on the BAAPI computing system 101. In some embodiments, BAAPI may be split into microservices, with the BAAPI computing system 101 configured to simultaneously run multiple instances of BAAPI. The BAAPI computing system 101 may be configured in this way because although the majority of the BAAPI functions may be carried out asynchronously, in certain situations BAAPI cannot perform asynchronous functions. As an illustration, while smart contract code is compiling, the compiling must be completed and the results of the compiling must be delivered to the user before anything further may be done with the smart contract. In order to prevent premature actions regarding the smart contract before the compiling is complete, the BAAPI computing system 101 may block the particular instance of BAAPI compiling the smart contract code. While the BAAPI instance is blocked, for example, no other compiling may occur on the blocked BAAPI instance. This would be an issue for the BAAPI computing system 101 if it ran only one instance of BAAPI, as it would be limited to compiling one set of smart contract code at a time. However, by running multiple instances of BAAPI, the BAAPI computing system 101 may allow additional smart contract codes to be compiled on other instances of BAAPI, even while the particular instance of BAAPI is blocked. Because of the microservices, the BAAPI computing system 101 therefore allows for smooth and continuous compiling, deploying, etc. of multiple sets of smart contract codes simultaneously while preventing unwanted interactions, for example, with smart contracts in the process of being compiled.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing computers, including processing units, system memory, and system buses that couple various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:
receiving, by a smart contract computing system, smart contract code, the smart contract code defining terms of a smart contract;
detecting, by the computing system, a code language of the smart contract code, wherein each of a plurality of code languages is associated with at least one of a plurality of blockchain platforms;
determining, by the computing system, based at least partially on the code language of the smart contract code, an optimal blockchain platform to deploy the smart contract onto, the optimal blockchain platform being one of the plurality of blockchain platforms associated with the detected code language, the smart contract code capable of being deployed onto two or more blockchain platforms;
compiling, by the computing system, the smart contract code based on the determination of the optimal blockchain platform so as to generate smart contract byte code and metadata;
storing, by the computing system, the smart contract byte code and the metadata;
deploying, by the computing system, the smart contract byte code to the optimal blockchain platform;

receiving, by the computing system, from the optimal blockchain platform, an address of the smart contract deployed to the optimal blockchain platform;

assigning, by the computing system, a name to the address; and storing, by the computing system, the assigned name and the address in a smart contract naming directory;

wherein the smart contract computing system is configured to identify the address of the deployed smart contract in response to receiving the name from a user.

2. The method of claim 1, wherein deploying the smart contract byte code to the optimal blockchain platform comprises:

receiving, by the computing system, an instruction to deploy the smart contract code;

identifying, by the computing system, the stored metadata associated with the smart contract code;

verifying, by the computing system, with the stored metadata, whether the instruction to deploy the smart contract code meets requirements, defined in the metadata, for deploying the smart contract code; and in response to verifying that the instruction to deploy the smart contract code meets the requirements, deploying, by the computing system, the smart contract byte code to the optimal blockchain platform.

3. The method of claim 1, further comprising:

receiving from the user, by the computing system, the assigned name of the smart contract;

receiving from the user, by the computing system, an instruction to execute an operation defined in the smart contract code;

identifying, by the computing system, the stored metadata associated with the smart contract code;

verifying, by the computing system, via the stored metadata that the operation is defined in the smart contract code;

identifying, by the computing system, the address of the smart contract deployed to the optimal blockchain platform, via the assigned name;

verifying, by the computing system, that the smart contract is running on a blockchain of the optimal blockchain platform;

executing, by the computing system, the operation; and returning, by the computing system, a result of the executed operation to the user.

4. The method of claim 3, further comprising:

determining, by the computing system, whether the operation will require a change to the deployed smart contract byte code on the blockchain of the optimal blockchain platform;

after executing the operation, and in response to determining that the operation will require the change to the deployed byte code, monitoring, by the computing system, the blockchain for a confirmation or an error of the operation;

in response to receiving a confirmation or an error of the operation, updating, by the computing system, the stored metadata with a status of the operation; and returning, by the computing system, the status of the operation to the user.

5. The method of claim 1, further comprising:

making public, by the computing system, names of a plurality of operations defined in the smart contract; and keeping private, by the computing system, the smart contract code and the smart contract byte code.

6. The method of claim 1, further comprising:

receiving from the user, by the computing system, the assigned name of the smart contract;

receiving, by the computing system, modifying smart contract code, the modifying smart contract code including modifications to the terms of the smart contract;

compiling, by the computing system, the modifying smart contract code based on the optimal blockchain platform so as to generate modifying smart contract byte code and modifying metadata;

storing, by the computing system, the modifying smart contract byte code and the modifying metadata;

identifying, by the computing system, the address of the smart contract deployed to the optimal blockchain platform, via the assigned name;

verifying, by the computing system, that the smart contract is running on a blockchain of the optimal blockchain platform;

deploying, by the computing system, the modifying smart contract byte code to the optimal blockchain platform so as to modify the terms of the smart contract; and in response to deploying the modifying smart contract byte code, updating, by the computing system, the metadata to include the modifying metadata.

7. The method of claim 1, further comprising:

prior to deploying the smart contract byte code to the optimal blockchain platform, reviewing, by the computing system, the smart contract byte code for security weaknesses.

8. The method of claim 1, further comprising:

providing by the computing system, a plurality of blockchain operations to the user, wherein the plurality of blockchain operations are defined by the optimal blockchain platform.

9. The method of claim 8, further comprising:

receiving, by the computing system, an instruction to execute one of the plurality of blockchain operations;

translating, by the computing system, the instruction to be compatible with the optimal blockchain platform; and executing, by the computing system, the blockchain operation.

10. The method of claim 1, further comprising:

receiving, by the computing system, an owner address from the user, wherein the owner address is an address the user intends as an owner of the smart contract once the smart contract is deployed; and after deploying the smart contract byte code to the optimal blockchain platform, assigning, by the computing system, the owner address as the owner of the deployed smart contract.

11. The method of claim 10, wherein determining the optimal blockchain platform comprises:

determining, by the computing system, that more than one of the plurality of blockchain platforms is a potential optimal blockchain platform to deploy the smart contract onto solely based on the code language of the smart contract code; and in response to determining that more than one of the plurality of blockchain platforms is a potential optimal blockchain platform based on the code language, determining, by the computing system, the optimal blockchain platform based at least partially on the code language of the smart contract code and a structure of the owner address.

12. The method of claim 1, wherein determining the optimal blockchain platform comprises:

determining, by the computing system, that more than one of the plurality of blockchain platforms is a potential optimal blockchain platform to deploy the smart contract onto solely based on the code language of the smart contract code; and in response to determining that more than one of the plurality of blockchain platforms is a potential optimal blockchain platform based on the code language, determining, by the computing system, the optimal blockchain platform based at least partially on the code language and a cost of deploying the smart contract to each of the plurality of blockchain platforms.

13. The method of claim 1, wherein the address is an original address and the method further comprises:

monitoring, by the computing system, the original address of the smart contract deployed to the optimal blockchain platform;

receiving, by the computing system, an indication from the optimal blockchain platform that the smart contract deployed to the optimal blockchain platform has been assigned a new address;

assigning, by the computing system, the name to the new address; and updating, by the computing system, the naming directory to replace the original address with the new address; and wherein, after the naming directory is updated to replace the original address with the new address, the smart contract computing system is configured to identify the new address of the deployed smart contract, instead of the original address, in response to receiving the name from the user.

14. A method, comprising:

receiving, by a smart contract computing system, smart contract code, the smart contract code defining terms of a smart contract;

receiving from a user, by the computing system, a call name for the smart contract;

detecting, by the computing system, a code language of the smart contract code, wherein each of a plurality of code languages is associated with at least one of a plurality of blockchain platforms;

determining, by the computing system, based at least partially on the code language of the smart contract code, an optimal blockchain platform to deploy the smart contract onto, the optimal blockchain platform being one of the plurality of blockchain platforms associated with the detected code language, the smart contract code capable of being deployed onto two or more blockchain platforms;

compiling, by the computing system, the smart contract code based on the determination of the optimal blockchain platform so as to generate smart contract byte code and metadata;

storing, by the computing system, the smart contract byte code and the metadata, including associating the smart contract byte code and the metadata with the call name;

receiving from the user, by the computing system, an instruction to deploy the smart contract known by the call name;

identifying, by the computing system, the stored smart contract byte code associated with the call name;

deploying, by the computing system, the smart contract byte code to the optimal blockchain platform;

receiving, by the computing system, from the optimal blockchain platform, an address of the smart contract deployed to the optimal blockchain platform;

assigning, by the computing system, a name to the address; and storing, by the computing system, the assigned name and the address in a smart contract naming directory;

wherein the smart contract computing system is configured to identify the address of the deployed smart contract in response to receiving the assigned name from the user.

15. The method of claim 14, further comprising:

receiving from the user, by the computing system, the assigned name of the smart contract;

receiving from the user, by the computing system, an instruction to execute an operation defined in the smart contract code;

identifying, by the computing system, the stored metadata associated with the smart contract code;

verifying, by the computing system, via the stored metadata that the operation is defined in the smart contract code;

identifying, by the computing system, the address of the smart contract deployed to the optimal blockchain platform, via the assigned name;

verifying, by the computing system, that the smart contract is running on a blockchain of the optimal blockchain platform;

executing, by the computing system, the operation; and returning, by the computing system, a result of the executed operation to the user.

16. The method of claim 14, further comprising:

providing, by the computing system, a plurality of blockchain operations to the user, wherein the plurality of blockchain operations are defined by the optimal blockchain platform;

receiving, by the computing system, an instruction to execute one of the plurality of blockchain operations;

translating, by the computing system, the instruction to be compatible with the optimal blockchain platform; and executing, by the computing system, the blockchain operation.

17. The method of claim 14, further comprising:

receiving, by the computing system, an owner address from the user, wherein the owner address is an address the user intends as an owner of the smart contract once the smart contract is deployed; and wherein determining the optimal blockchain platform comprises:

determining, by the computing system, that more than one of the plurality of blockchain platforms is a potential optimal blockchain platform to deploy the smart contract onto solely based on the code language of the smart contract code; and in response to determining that more than one of the plurality of blockchain platforms is a potential optimal blockchain platform based on the code language, determining, by the computing system, the optimal blockchain platform based at least partially on the code language of the smart contract code and a structure of the owner address.

18. The method of claim 14, wherein determining the optimal blockchain platform comprises:

determining, by the computing system, that more than one of the plurality of blockchain platforms is a potential optimal blockchain platform to deploy the smart contract onto solely based on the code language of the smart contract code; and in response to determining that more than one of the plurality of blockchain platforms is a potential optimal blockchain platform based on the code language, determining, by the computing system, the optimal blockchain platform based at least partially on the code language and a cost of deploying the smart contract to each of the plurality of blockchain platforms.

19. The method of claim 14, wherein the address is an original address and the method further comprises:
monitoring, by the computing system, the original address of the smart contract deployed to the optimal blockchain platform;
receiving, by the computing system, an indication from the optimal blockchain platform that the smart contract deployed to the optimal blockchain platform has been assigned a new address;
assigning, by the computing system, the name to the new address; and
updating, by the computing system, the naming directory to replace the original address with the new address; and
wherein, after the naming directory is updated to replace the original address with the new address, the smart contract computing system is configured to identify the new address of the deployed smart contract, instead of the original address, in response to receiving the name from the user.

20. A system, comprising a processor coupled to a non-transitory storage medium including instructions stored thereon that, when executed by the processor, cause the system to:
receive smart contract code, the smart contract code defining terms of a smart contract;
detect a code language of the smart contract code, wherein each of a plurality of code languages is associated with at least one of a plurality of blockchain platforms;
determine based at least partially on the code language of the smart contract code, an optimal blockchain platform to deploy the smart contract onto, the optimal blockchain platform being one of the plurality of blockchain platforms associated with the detected code language the smart contract code capable of being deployed onto two or more blockchain platforms;
compile the smart contract code based on the determination of the optimal blockchain platform so as to generate smart contract byte code and metadata;
store the smart contract byte code and the metadata;
deploy the smart contract byte code to the optimal blockchain platform;
receive an address from the optimal blockchain platform of the smart contract deployed to the optimal blockchain platform;
assign a name to the address; and
store the assigned name and the address in a smart contract naming directory;
wherein the system is configured to identify the address of the deployed smart contract in response to receiving the name from a user.

21. The system of claim 20, wherein the instructions further cause the system to deploy the smart contract byte code to the optimal blockchain platform by:
receiving an instruction to deploy the smart contract code;
identifying the stored metadata associated with the smart contract code;
verifying, with the stored metadata, whether the instruction to deploy the smart contract code meets requirements, defined in the metadata, for deploying the smart contract code; and in response to verifying that the instruction to deploy the smart contract code meets the requirements, deploying, the smart contract byte code to the optimal blockchain platform.

22. The system of claim 20, wherein the instructions further cause the system to:
receive from the user the assigned name of the smart contract;
receive from the user an instruction to execute an operation defined in the smart contract code;
identify the stored metadata associated with the smart contract code;
verify via the stored metadata that the operation is defined in the smart contract code;
identify the address of the smart contract deployed to the optimal blockchain platform, via the assigned name;
verify that the smart contract is running on a blockchain of the optimal blockchain platform;
execute the operation; and
return a result of the executed operation to the user.

23. The system of claim 20, wherein the instructions further cause the system to:
receive, from the user, the assigned name of the smart contract;
receive modifying smart contract code, the modifying smart contract code including modifications to the terms of the smart contract;
compile the modifying smart contract code based on the optimal blockchain platform so as to generate modifying smart contract byte code and modifying metadata;
store the modifying smart contract byte code and the modifying metadata;
identify the smart contract deployed to the optimal blockchain platform, via the assigned name;
verify that the smart contract is running on a blockchain of the optimal blockchain platform;
deploy the modifying smart contract byte code to the optimal blockchain platform so as to modify the terms of the smart contract; and
in response to deploying the modifying smart contract byte code, update the metadata to include the modifying metadata.

24. The system of claim 20, wherein the instructions further cause the system to:
provide a plurality of blockchain operations to the user;
receive an instruction to execute one of the plurality of blockchain operations;
translate the instruction to be compatible with the optimal blockchain platform; and
execute the blockchain operation.

25. The system of claim 20, wherein the instructions further cause the system to:
receive an owner address from the user, wherein the owner address is an address the user intends as an owner of the smart contract once the smart contract is deployed; and
determine the optimal blockchain platform by:
determining that more than one of a plurality of blockchain platforms is a potential optimal blockchain platform to deploy the smart contract onto solely based on the code language of the smart contract code; and
in response to determining that more than one of the plurality of blockchain platforms is a potential optimal blockchain platform based on the code language, determining the optimal blockchain platform based at least partially on the code language of the smart contract code and a structure of the owner address.

26. The system of claim 20, wherein the instructions cause the system to determine the optimal blockchain platform by:
- determining that more than one of the plurality of blockchain platforms is a potential optimal blockchain platform to deploy the smart contract onto solely based on the code language of the smart contract code; and
- in response to determining that more than one of the plurality of blockchain platforms is the potential optimal blockchain platform based on the code language alone, determine the optimal blockchain platform based at least partially on the code language and a cost of deploying the smart contract to each of the plurality of blockchain platforms.

27. The system of claim 20, wherein the address is an original address, and wherein the instructions further cause the system to:
- monitor the original address of the smart contract deployed to the optimal blockchain platform;
- receive an indication from the optimal blockchain platform that the smart contract deployed to the optimal blockchain platform has been assigned a new address;
- assign the name to the new address; and
- update the naming directory to replace the original address with the new address; and
- wherein, after the naming directory is updated to replace the original address with the new address, the system is configured to identify the new address of the deployed smart contract, instead of the original address, in response to receiving the name from the user.

28. The system of claim 20, the system further comprising a test network configured to test the smart contract byte code prior to the smart contract byte code being deployed to the optimal blockchain platform by the computing system, the test determining whether the smart contract byte code will deploy correctly to the optimal blockchain platform.

29. The system of claim 20, wherein the instructions further include a plurality of instances of an application programming interface (API);
- wherein each instance of the API, when executed by the processor, causes the system to separately perform, for a plurality of sets of smart contract code, steps of receiving smart contract code, detecting a code language, determining an optimal blockchain platform, compiling the smart contract code, storing the smart contract byte code and the metadata, deploying the smart contract byte code, receiving an address of the smart contract, assigning a name to the address, and storing the associated name and the address; and
- wherein each instance of the API is configured to be executed simultaneous to the remaining plurality of API instances.

30. The system of claim 29, wherein while a given API instance is causing the system to perform the step of compiling the smart contract code, the given API instance causes the system to not perform any other step.

* * * * *